United States Patent [19]

Emery

[11] Patent Number: 5,755,481
[45] Date of Patent: May 26, 1998

[54] BED LINER WITH FOLDABLE SIDE WALLS

[75] Inventor: Phillip L. Emery, Portage, Wis.

[73] Assignee: Penda Corporation, Portage, Wis.

[21] Appl. No.: 462,622

[22] Filed: Jun. 5, 1995

[51] Int. Cl.$^6$ .................................................. B60R 13/01
[52] U.S. Cl. .............................. 296/39.1; 296/39.2
[58] Field of Search ........................ 296/39.1, 39.2

[56] References Cited

U.S. PATENT DOCUMENTS

| | | |
|---|---|---|
| 4,279,439 | 7/1981 | Cantori ............................ 296/39.2 |
| 4,333,678 | 6/1982 | Munoz et al. ..................... 296/39.2 |
| 4,575,146 | 3/1986 | Markos . | 
| 4,592,583 | 6/1986 | Dresen et al. . | 
| 4,750,776 | 6/1988 | Barben . | 
| 4,779,752 | 10/1988 | Vallee et al. ..................... 296/39.2 |
| 4,890,874 | 1/1990 | Davis ............................... 296/39.2 |
| 4,991,899 | 2/1991 | Scott ............................... 296/39.2 |
| 5,207,472 | 5/1993 | Gower .............................. 296/39.2 |
| 5,221,119 | 6/1993 | Emery .............................. 296/39.2 |

*Primary Examiner*—Dennis H. Pedder
*Attorney, Agent, or Firm*—Lathrop & Clark

[57] ABSTRACT

The invention provides a thermoplastic bed liner that is molded with side walls which are formed using large draft angles and which are hinged to the bottom wall along fold lines so that the side walls are pivotable from as molded positions to substantially more upright installed positions. To finish the molded bed liner, blank or cutout sections are removed from the front corners of the bed liner and from between wheelwell covers and the bottom wall of the bed liner. Removal of the cutout sections permits the side walls to be pivoted between their as molded positions and their installed positions.

7 Claims, 4 Drawing Sheets

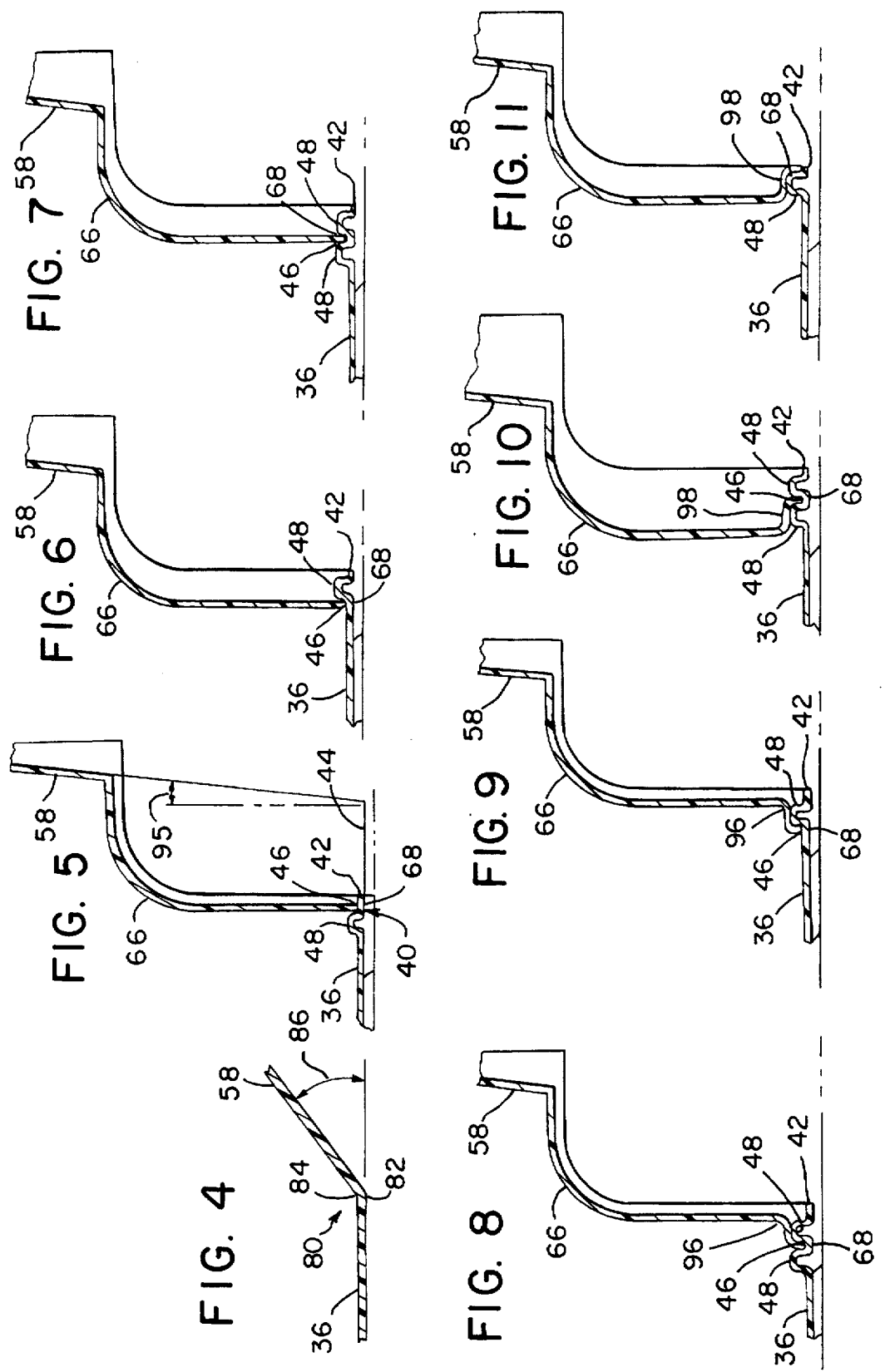

BED LINER WITH FOLDABLE SIDE WALLS

BACKGROUND OF THE INVENTION

1. Field of the Invention

The invention relates generally to pick-up trucks and to non-metallic bed liners for pick-up truck cargo beds, and more particularly to thermoformed thermoplastic bed liners.

2. Reference to Prior Art

Pick-up trucks with open cargo boxes or beds enjoy widespread popularity as work and leisure related vehicles. To protect the painted metal interior surfaces of the cargo bed from scratches, dents, chips and other damage, trucks are commonly provided with rubber or plastic bed liners. Examples of plastic bed liners produced by Penda Corporation, Portage, Wis., the assignee of the present invention, are provided in U.S. Pat. Nos. 4,575,146, 4,592, 983 and 5,221,119. Examples of other bed liners are provided in U.S. Pat. Nos. 4,958,876, 4,767,149, 4,047,749, 4,750,776 and 4,991,899.

A known thermoplastic bed liner construction includes a bottom wall, opposite side walls molded to the bottom wall, and a front wall molded to the bottom wall and to the side walls along integrally molded front corners to form a three-sided box. To install an under-the-rail style bed liner, the side walls of the bed liner are bent so that their upper margins fit beneath the rails of the cargo bed side walls. The bed liner side walls are then permitted to snap back into place. Because integrally molded corners interconnect the front and side walls of the bed liner, it is sometimes difficult to manipulate the liner side walls to properly position the bed liner in the cargo bed.

Known molding techniques for manufacturing thermoplastic bed liners include thermoforming or vacuum forming processes. In those processes a planar thermoplastic sheet is heated and then drawn onto a thermoforming mold to form the sheet to the desired bed liner shape. After the molded part has partially cooled it is removed from the mold and trimmed to its final configuration. When forming the bed liner it is desirable to incorporate draft into the mold and liner designs for improved forming and demolding of the molded liner. Providing draft to bed liner walls also improves nestability so that the bed liners can be efficiently stacked for storage or shipment. However, there are limits to the amount of acceptable draft in bed liner walls. For example, draft in the bed liner walls generally results in the formation of voids between those walls and the cargo bed walls because the bed liner walls do not lay flat against the cargo bed walls. Those voids represent lost space in the interior of the lined cargo bed. Thus, excessive draft angles are undesirable, and in most applications side wall draft is maintained below about 12 degrees.

Additionally, cargo beds are sometimes provided with accessories such as recessed cargo securement cleats or hooks, for example. While it is possible to incorporate reverse draft or undercuts into thermoformed bed liners to provide protected access pockets for various underlying cargo bed features, those alternatives sometimes interfere with bed liner nestability. Reverse drafts and undercuts also present more difficult molding and demolding conditions and more complicated molds, especially when draft angles are minimized.

SUMMARY OF THE INVENTION

The invention provides an improved bed liner for the cargo bed of a pick-up truck. The improved bed liner includes side walls that are pivotable over a substantial angular range from as molded positions to positions to be assumed upon installation in the cargo bed of a pick-up truck (i.e., installed positions). In the as molded positions the side walls exhibit substantially increased draft angles used in their formation (i.e., the side walls are oriented at substantially greater than 12 degrees from vertical). To facilitate easy installation of the improved bed liner in a cargo bed, the liner side walls can be pivoted to their installed positions (or even beyond their installed positions to fit the upper margins of the liner side walls beneath the rails of the cargo bed walls if the bed liner is an under-the-rail style liner).

By forming the improved bed liner with larger draft angles than are employed in prior art bed liner designs formation and demolding of the bed liner are improved and bed liner nestability is also improved. Also, by increasing draft the bed liner side walls can be made to more closely conform to features of the cargo bed. In particular, due to substantially increased draft, areas of the bed liner that would have required reverse draft or undercuts in prior art bed liners are formable without those techniques or with less profound use of those techniques. The use of increased draft angles also improves draw conditions in the mold so that the "starting gauge" of the thermoplastic sheet used to form the bed liner can be reduced while still maintaining adequate thickness in all parts of the bed liner. By pivoting the side walls to narrow the substantial draft angles the foregoing advantages are achievable without sacrificing interior space in the cargo bed.

In one embodiment the improved bed liner is molded with side walls that are formed using large draft angles and that are hinged to the bottom wall along fold lines so that the side walls are pivotable from as molded positions to substantially more upright installed positions. To finish the molded bed liner, blank or cutout sections are removed from the front corners of the bed liner and from between the wheel covers and the bottom wall of the bed liner. Removal of the cutout sections permits the side walls to be pivoted between their as molded positions and their installed positions.

More particularly, the invention provides a bed liner including a bottom wall, a front wall integrally molded to the bottom wall and including opposite side edge portions, and opposite side walls integrally molded to the bottom wall. Each of the side walls includes a front edge portion, and each of the side walls is pivotable relative to the bottom wall between an as molded position and an installed position. In the as molded positions the front edge portions of the side walls are separated from the front wall, and in the installed positions the front edge portions of the side walls engage the side edge portions of the front wall.

The invention also provides a thermoplastic bed liner including a bottom wall, a front wall integrally molded to the bottom wall, and a side wall integrally molded to the bottom wall. The side wall is pivotable relative to the bottom wall between an installed position wherein the side wall overlaps the front wall, and an as molded position wherein the side wall is separated from the front wall by a wedge-shaped gap left by removing one of the aforementioned cutout sections.

The invention further provides a method for making a bed liner. That bed liner is made by thermoforming a sheet of thermoplastic material in a conventional manner to produce an unfinished integrally molded bed liner having a bottom wall, a front wall, and opposite side walls each integrally joined to the bottom wall along a fold line. With the bed liner in an unfinished state the side walls are positioned in as molded positions with wedge-shaped front corner cutouts being positioned between the front edge portions of the side walls and side edge portions of the front wall. The front corner cutouts facilitate use of large draft angles and are removed during finishing of the bed liner to permit the side walls to be pivoted to installed positions. If the side walls are provided with wheelwell covers, the unfinished bed liner also includes wheelwell cover cutouts between lower edge portions of the wheelwell covers and the bottom wall. Those cutouts are also removed in finishing the bed liner, and the bottom wall is formed with wheel cover seating areas or portions on which the lower edges of the wheelwell covers seat when the side walls are pivoted to their installed positions.

Other features and advantages of the invention will become apparent to those skilled in the art upon review of the following detailed description, claims and drawings.

BRIEF DESCRIPTION OF THE DRAWINGS

FIG. 4 is a cross-sectional view taken along line 4—4 in FIG. 3.

FIGS. 5–11 are cross-sectional views taken generally along line 5—5 in FIG. 3 and illustrate alternative designs for the wheelwell cover/bottom wall interface area.

Figure 1:
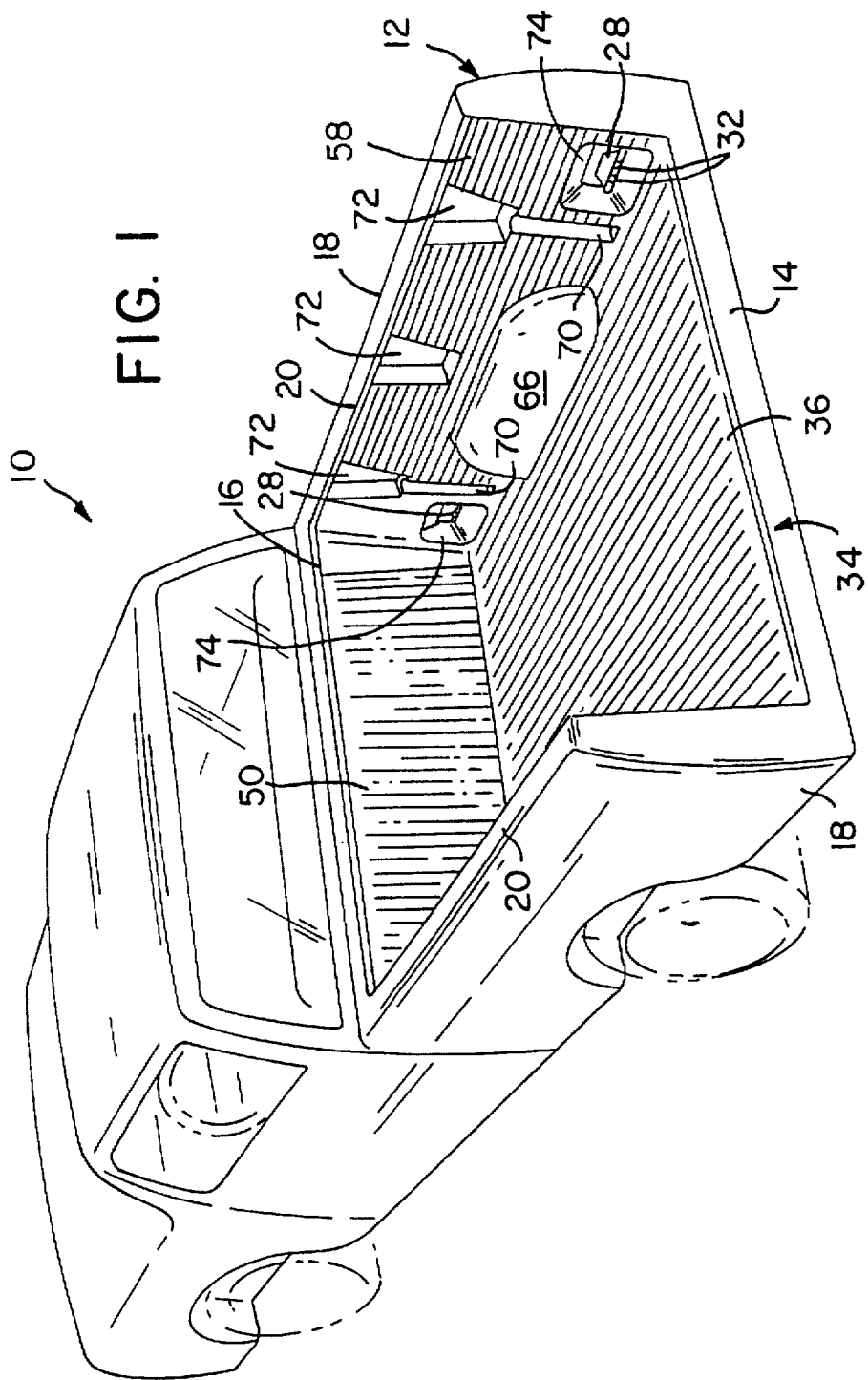
FIG. 1 is a rear perspective view of a pick-up truck including a bed liner embodying features of the invention.

Before an embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF A PREFERRED EMBODIMENT

Illustrated in FIG. 1 is a pick-up truck 10 including a cargo bed 12 that is shown with the tailgate removed. While the cargo bed 12 can have various configurations, as is understood by those skilled in the art, in the particular arrangement illustrated in the drawings the cargo bed 12 is (see FIG. 3) a three-sided sheet metal box structure having a generally horizontal bottom wall or floor 14, a front wall 16 and opposite side walls 18. The side walls 18 are mirror images of each other and each is provided with a rail 20 at its upper end. In the illustrated arrangement wheelwells 22 are also provided on the cargo bed 12. In other cargo bed constructions wheelwells 22 can be omitted.

Figure 3:
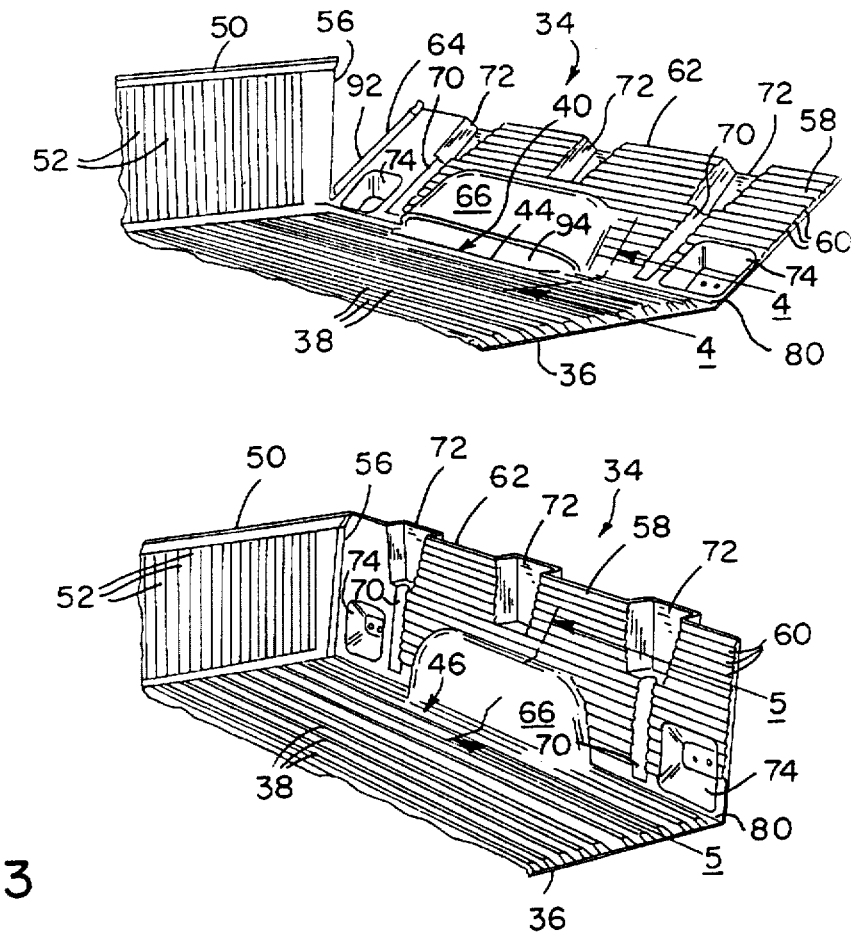
FIG. 3 is an exploded perspective view of the cargo bed and a portion of the bed liner of the pick-up truck illustrated in FIG. 1, the bed liner being shown with a side wall in as molded and installed positions.
Figure 3:
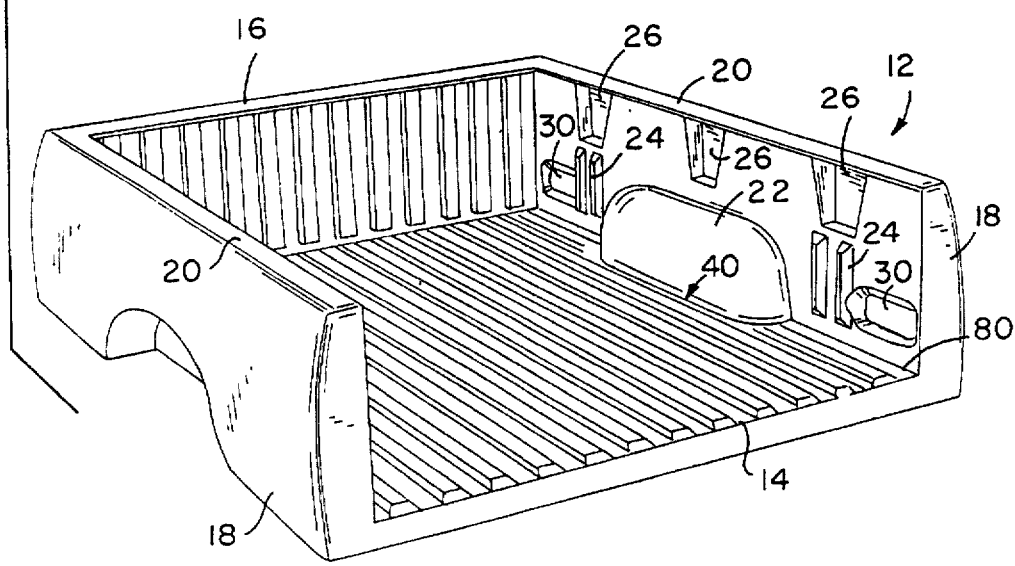

As shown in FIG. 3, the cargo bed 12 also includes various cargo securement and support features. Those features include vertical board restraint structures 24 and board support structures 26 on the side walls 18. In the particular embodiment illustrated in the drawings those features also include cargo securement accessories such as cleats 28 (FIG. 1) that are secured in recessed areas 30 (FIG. 3) in the side walls 18 by suitable means such as fasteners 32.

The pick-up truck 10 also includes a cargo bed liner 34 that is preferably made of a thermoplastic material such as high density polyethylene. While the bed liner 34 can have a variety of configurations without departing from the invention, in the illustrated arrangement the bed liner 34 includes a bottom wall 36 that has a plurality of reinforcing ribs 38 and is sized to substantially overlie the truck bed floor 14, as shown in FIG. 1. The bottom wall 36 also includes opposite rim portions 40 (only one is shown) which are preferably mirror images of each other and which function as seating portions for wheelwell covers on the bed liner 34 as is more fully explained below. In one embodiment (see FIG. 5) each of the rim portions 40 includes an outer edge 42 that defines a generally semi-ovular opening 44, an upwardly facing seating surface 46, and a raised dam or lip portion 48 on the inside of the seating surface 46.

The bed liner 34 also includes a front wall 50 that has a plurality of reinforcing corrugations or ribs 52 and that is integrally molded to the bottom wall 36. The front wall 50 is symmetrical about a centerline 54 and includes opposite side edge portions 56 (only one is shown) that are generally vertically oriented when the bed liner 34 is mounted in the cargo bed 12.

Figure 2:
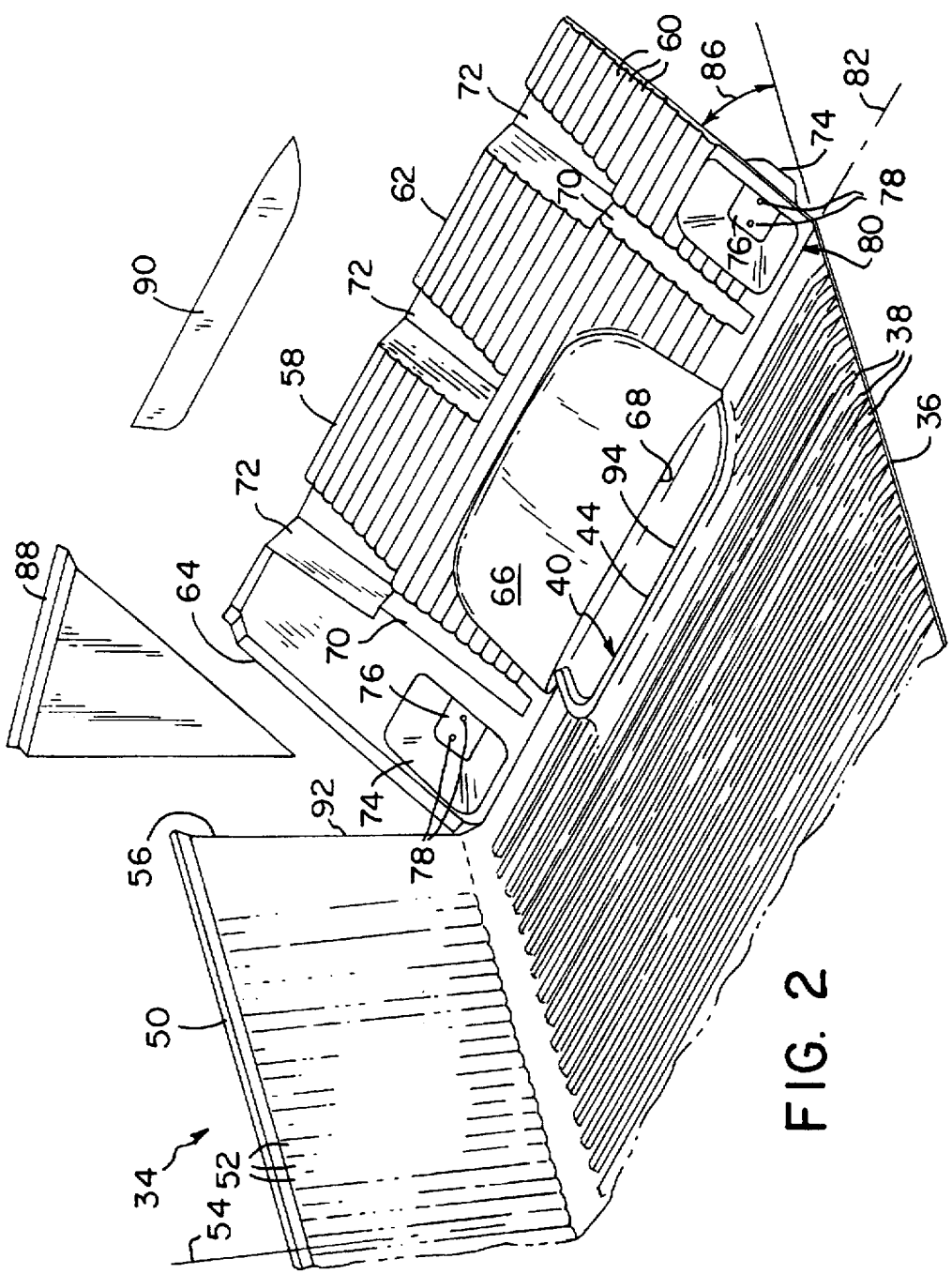
FIG. 2 is a perspective view of a portion of the bed liner illustrated in FIG. 1 which is shown with cutout sections that are removed in a processing step to finish the bed liner from its as molded state.

The bed liner 34 also includes opposite side walls 58 (only one is shown) that are mirror images of one another and that each include reinforcing corrugations or ribs 60, an upper margin 62, a front edge portion 64, and a wheelwell cover 66. The wheelwell cover 66 is integrally molded to the side wall portion 58 and has (FIG. 2) a lower edge portion 68 that is seatable on (FIG. 5) one of the rim portions 40. The wheel well cover 66 curves inward as it extends upward along the side wall 58 towards the upper margin 62, and extends inward along the lower edge portion 68 as it extends downward towards the bottom wall 36. In the illustrated arrangement each of the side walls 58 is also provided with board restraint channels 70, board support pockets 72, and recessed access pockets 74. As shown in FIG. 2, the pockets 74 are provided with a base wall 76 having holes 78 for the fasteners 32.

To permit the side walls 58 to pivot relative to the bottom wall 36, each of the side walls 58 is joined to the bottom wall 36 by a hinge 80. Accordingly, the bed liner 34 is provided with means between the bottom wall 36 and each of the side walls 58 for forming the hinges 80 therebetween. While the hinges 80 can be formed in other ways and can be separated from or integrated into the molded bed liner 34, in the illustrated embodiment the side walls 58 are integrally molded to the bottom wall 36 and the hinges 80 are living hinges that each form a fold line which provides a pivot axis 82 for a corresponding one of the side walls 58.

In the particular embodiment illustrated in the drawings (FIG. 4) each of the living hinges 80 is formed by a notch 84 between the bottom wall 36 and the corresponding side wall 58. Alternatively, the living hinge 80 could be formed by other means that provide a thinned material cross-section relative to adjacent areas of the bottom wall 36 and one of the side walls 58 or by a scored line, for example.

The bed liner 34 is preferably molded as a one-piece unit using a vacuum thermoforming process such as is known to those skilled in the art. Briefly, in that process a planar thermoplastic sheet is heated and then drawn onto a thermoforming mold (not shown) to form the sheet to a desired shape. After the molded part has partially cooled it is removed from the mold and trimmed to its final configuration.

Due to considerable draft employed in forming the bed liner 34, the side walls 58 are inclined outwardly to a significantly greater degree than are side walls in prior art molded plastic bed liners. Each of the side walls 58, when in its as molded position, forms an angle with the horizontal bottom wall 36 that is indicated in FIGS. 2 and 4 with reference numeral 86. While angle 86 may vary depending on the desired configuration of the bed liner 34, in one embodiment the angle 86 is about 36 degrees, thus forming a complementary draft angle which is over four times (i.e., about 54 degrees) greater than prior art draft angles of 4–12 degrees.

When in an unfinished molded blank state, the bed liner 34 includes a pair of wedge-shaped blank or cutout sections 88 (only one is shown in FIG. 2) formed between the side edge portions 56 of the front wall 50 and the front edge portions 64 of the side walls 58. In the embodiment shown in the drawings the unfinished bed liner 34 is also formed with a pair of wheelwell cover blanks or cutout sections 90 (only one is shown in FIG. 2). The wheelwell cutout sections 90 are formed between the outer edges 42 of the bottom wall 36 and the lower edge portions 68 of the side walls 58. In finishing the bed liner 34 the cutout sections 88 and 90 are cut from the bed liner 34 to leave wedge-shaped gaps 92 (only one is shown) and gaps 94 (only one is shown) beneath the wheelwell covers 66. The removal of the cutout sections 88 and 90 permits the side walls 58 to be pivoted to more upright positions or installed positions (shown with respect to one of the side walls in FIGS. 1 and 3).

When the side walls 58 are folded inwardly to their installed positions the front edge portions 64 overlap and engage the side edge portions 56 of the front wall 50 to close the gaps 92, and the lower edge portions 68 of the wheelwell covers 66 seat on the seating surfaces 46 (FIG. 5) to close the gaps 94. This gives the bed liner 34 a finished, integrally molded appearance. If desired, mechanical means such as adhesives, fasteners or snap-together joints could be used to join the side walls 58 to the front wall 50 and the wheelwell covers 66 to the bottom wall 36. When the side walls 58 are in their installed nearly vertical positions they may be inclined at a desired angle (indicated by reference numeral 95 in FIG. 5) relative to the side walls 18. That angle 95 is typically from 4–12 degrees, and in the embodiment illustrated is about 5 degrees. Thus, while the range of pivotal movement can vary, as desired, in the illustrated arrangement the side walls 58 have a pivotal range of greater than 45 degrees.

Also, the amount of available space in the interior of the cargo bed 12 is not adversely affected by the large draft angles used to form the bed liner 34. In fact, interior cargo bed space may be increased by using the bed liner 34 since the side walls 58 can be positioned vertically, if desired, to substantially eliminate any space between the bed liner side walls 58 and the cargo bed side walls 18. That space is inherent in cargo beds that are fitted with prior art bed liners having integrally molded side walls that are permanently inclined.

To install the bed liner 34 after it has been trimmed to remove the cutout sections 88 and 90, the cleats 28 are first preferably removed from the cargo bed 12. (If the base walls 76 of the pockets 74 are removed or slotted to accommodate the cleats 28 they need not be removed.) The bed liner side walls 58 are then folded upwardly so that the bed liner 34 can be fitted into the cargo bed 12 with the bottom wall 36, the front wall 50 and the side walls 58 of the bed liner 34 overlaying the horizontal floor 14, and the vertical front wall 16 and the side walls 18 of the cargo bed 12, respectively. When the bed liner 34 is fitted into the cargo bed 12 the board restraint channels 70 fit into and are supported by the board restraint structures 24, the board support pockets 72 fit into and are supported by the board support structures 26, and the pockets 74 fit into the recessed areas 30. The integrally molded pockets 74 replace holes in prior art bed liners and prevent water, debris, etc. from entering between the bed liner side walls 58 and the cargo bed side walls 18. If needed, the side walls 58 can be bent inwardly or folded beyond their installed positions so their upper margins 62 can be positioned under the rails 20 of the cargo bed side walls 18. The cleats 28 are then reinstalled over the base walls 76 of the pockets 74, and additional securing means, such as fasteners (not shown) are installed to secure the bed liner 34 in the cargo bed 12.

Illustrated in FIGS. 6–11 are alternative designs for the interface between the bottom wall 36 and the wheelwell covers 66, and the same reference numerals are used to denote elements common to those embodiments. In particular, FIG. 6 illustrates a modified version of the bottom wall/wheelwell cover interface area shown in FIG. 5. In the arrangement shown in FIG. 6, the seating surface 46 is on the inside of the lip portion 48, instead of the outside as shown in FIG. 5. The lip portion 48 in both cases provides a dam to prevent the ingress of water or debris between the bed liner side wall 58 and the cargo bed side wall 18.

The arrangement illustrated in FIG. 7 combines features of the arrangements of FIGS. 5 and 6 and includes a spaced apart pair of lip portions 48. The seating surface 46 is positioned between the lip portions 48.

In FIGS. 8 and 9, the wheelwell cover 66 is provided with an inwardly extending rolled over portion 96 that terminates at the lower edge portion 68. In FIG. 8 the bottom wall 36 is provided with double lip portions 48 (similar to FIG. 7), and in FIG. 9, the rolled over portion 96 seats on top of the single lip portion 48.

In FIGS. 10 and 11, the wheelwell cover 66 is provided with an outwardly extending rolled over portion 98 that terminates at the lower edge portion 68. In FIG. 10 the bottom wall 36 is provided with double lip portions 48 (similar to FIGS. 7 and 8), and in FIG. 11 the rolled over portion 98 seats on top of the single lip portion 48.

Advantageously, the foldable side walls 58 of the bed liner 34 facilitate the use of large draft angles during its formation to improve molding and demolding procedures and bed liner nestability. By using increased draft, bed liner features, such as the recessed access pockets 74, can also be more easily incorporated into the bed liner 34, and improved draw conditions facilitate the use of reduced thickness thermoplastic sheet material to form the bed liner 34. This is all accomplished without adversely affecting available interior cargo space in a cargo bed equipped with the bed liner 34.

Various features of the invention are set forth in the following claims.

I claim:

1. A bed liner of unitary vacuum formed thermoplastic material for use in the cargo bed of a pick-up truck having a generally horizontal floor, the bed liner comprising:

a bottom wall with molded structural configurations which is sized to substantially overlie the horizontal floor of the truck cargo bed;

a front wall with molded structural configurations which is integrally molded to the bottom wall and which extends generally upwardly therefrom when the bottom wall is in a normally horizontal position, the front wall including opposite side edge portions;

opposite side walls with molded structural configurations, each of the side walls being integrally molded to the bottom wall, each of the side walls including a front edge portion, and each of the side walls having a hinge section about which the side wall is pivotable relative to the bottom wall between an outwardly inclined as molded position wherein the front edge portion of said side wall is separated from the front wall, and a nearly vertical installed position wherein the front edge portion of said side wall engages one of the side edge portions of the front wall;

a wheel well cover section which is integrally molded to each side wall, the wheel well cover section extending inwardly and terminating in a lower edge portion as it extends towards the bottom wall; and a seating surface positioned along the lower edge portion of the wheel well cover section, wherein the seating surface engages an outside edge of a lip portion extending along the bottom wall as the side wall is pivoted about the side wall hinge section to place the side wall in the nearly vertical installed position, and wherein each of the side edge portions of the front wall and the front edge portion of an adjacent one of the side walls define therebetween a wedge-shaped cutout section when the adjacent side wall is in its outwardly inclined as molded position.

2. A thermoplastic bed liner for use in the cargo bed of a pick-up truck, the bed liner comprising:

a bottom wall with molded structural configurations;

a front wall with molded structural configurations integrally molded to the bottom wall;

a side wall with molded structural configurations which is integrally molded to the bottom wall, the side wall being pivotally connected along a hinge section to the bottom wall and pivotable between a nearly vertical installed position wherein the side wall overlaps the front wall, and an outwardly inclined as molded position wherein the side wall is separated from the front wall by a wedge-shaped cutout section;

a wheel well cover section which is integrally molded to each side wall, the wheel well cover section extending inward as it extends along the side wall, and terminating in a lower edge portion as it extends towards the bottom wall; and a seating surface positioned along the lower edge portion of the wheel well cover section, wherein the seating surface engages an outside edge of a lip portion extending along the bottom wall as the side wall is pivoted about the side wall hinge section to place the side wall in the nearly vertical installed position, and wherein the outside edge of the lip portion of the bottom wall is spaced from the seating surface by a wheel well cutout section when the side walls are in the as molded position, and wherein the front wall includes a side edge portion, and the side wall includes a front edge portion, and wherein the front edge portion of the side wall overlaps the side edge portion of the front wall when the side wall is in the installed position, and the side edge portion of the front wall and the front edge portion of the side wall define therebetween the wedge-shaped cutout section when the side wall is in the as molded position.

3. A molded blank of unitary vacuum formed thermoplastic material for a bed liner for use in the cargo bed of a pick-up truck, the bed liner molded blank comprising:

a horizontal bottom wall with molded structural configurations, a generally vertical front wall with molded structural configurations which is integrally molded to the bottom wall, a pair of opposite side wall portions with molded structural configurations which are each integrally molded to the bottom wall and which each extend upwardly and outwardly from the bottom wall in an inclined position, each of the side wall portions having a hinge section, a wheel well cover section integrally molded to each side wall portion and which extends inwardly therefrom, and which extends toward the bottom wall and terminates in a lower edge portion, opposite wheel well cut out sections integrally molded to the bottom wall and each extending upwardly therefrom to the lower edge portion of the adjacent wheel well cover section to which it is integrally joined, each wheel well cut out section being shaped so that when the cut out section is removed from the bed liner molded blank and the side wall portion and attached wheel well cover section are pivoted about the side wall hinge section to place the side wall portion in a nearly vertical installed position the lower edge portion of the wheel well cover section will engage the bottom wall, and a wedge shaped cut out section integrally molded between the front wall and each side wall portion, each of said wedge-shaped cut out sections maintaining each side wall portion in its inclined position and being shaped so that removal of the wedge-shaped cut out sections from the bed liner molded blank will permit the side wall portions to be pivoted about the side wall hinge sections to a nearly vertical installed position in which each side wall portion is closely aligned to the front wall.

4. A bed liner molded blank as set forth in claim 3 wherein each of the side wall portions is hinged to the bottom wall along a fold line, the fold lines forming pivot axes for the side wall portions.

5. A bed liner molded blank as set forth in claim 3 wherein the hinge sections of the side wall portions are living hinges molded integrally as parts of the bed liner.

6. A bed liner molded blank as set forth in claim 3 wherein the side wall portions are inclined from the vertical at least forty-five degrees.

7. A bed liner molded blank as set forth in claim 3 wherein the bottom wall includes a pair of seating portions shaped to receive and engage the lower edge portions of the wheel well cover sections after removal of the wheel well cut out sections when the side wall portions are pivoted on the hinge sections to a nearly vertical installed position.

* * * * *